(12) United States Patent
Harte

(10) Patent No.: US 10,268,640 B1
(45) Date of Patent: Apr. 23, 2019

(54) SYSTEM FOR COMMUNICATION OF OBJECT-DIRECTED FEELINGS

(71) Applicant: Darien Harte, Sherman Oaks, CA (US)

(72) Inventor: Darien Harte, Sherman Oaks, CA (US)

(*) Notice: Subject to any disclaimer, the term of this patent is extended or adjusted under 35 U.S.C. 154(b) by 314 days.

(21) Appl. No.: 15/256,620

(22) Filed: Sep. 4, 2016

Related U.S. Application Data

(60) Provisional application No. 62/214,211, filed on Sep. 4, 2015.

(51) Int. Cl.
| | |
|---|---|
| *G06F 17/30* | (2006.01) |
| *G06F 16/2457* | (2019.01) |
| *G06F 16/248* | (2019.01) |
| *G06F 16/28* | (2019.01) |

(52) U.S. Cl.
CPC ...... *G06F 16/24575* (2019.01); *G06F 16/248* (2019.01); *G06F 16/285* (2019.01)

(58) Field of Classification Search
CPC ......... G06F 17/30528; G06F 17/30554; G06F 17/30598; G06F 3/0482; G06F 17/276; G06F 17/2785; G06F 3/04886; G06F 17/30867; G06F 17/2881; G06F 3/04817; G06F 3/04842

USPC ........................................................ 707/722
See application file for complete search history.

(56) References Cited

U.S. PATENT DOCUMENTS

| | | | |
|---|---|---|---|
| 7,752,270 B2 | 7/2010 | Durand et al. | |
| 8,271,902 B1 | 9/2012 | Mangini et al. | |
| 8,918,339 B2* | 12/2014 | Rubinstein | G06Q 40/00 345/156 |
| 2014/0137043 A1* | 5/2014 | Matas | G06F 3/0488 715/835 |
| 2014/0195619 A1 | 7/2014 | Hodjat | |
| 2014/0279418 A1* | 9/2014 | Rubinstein | G06Q 40/00 705/39 |
| 2015/0067058 A1* | 3/2015 | Vellozo Luz | G06Q 10/103 709/204 |
| 2015/0088699 A1* | 3/2015 | Rubinstein | G06Q 40/00 705/27.2 |
| 2018/0373683 A1* | 12/2018 | Hullette | G06Q 50/01 |

* cited by examiner

*Primary Examiner* — Sheree N Brown

(57) ABSTRACT

The exemplary embodiments present a system for easy and rapid communication, display, and comparison of object-directed feelings.

20 Claims, 18 Drawing Sheets

| LOVING | GRATEFUL | SERENE | VERY HAPPY | IN LOVE | PASSIONATE | FASCINATED |
|---|---|---|---|---|---|---|
| IMPRESSED | AFFECTIONATE | HOPEFUL | HAPPY | CRAVING | EXCITED | AMAZED |
| IN AWE | RESPECTFUL | SYMPATHETIC | PLEASED | CURIOUS | PROUD | AMUSED |
| TERRIFIED | SCARED | ANXIOUS | NEUTRAL | IRRITATED | ANGRY | MAD |
| SUSPICIOUS | SKEPTICAL | TIRED | A LITTLE SAD | SURPRISED | IMPATIENT | HATEFUL |
| CONTEMPTUOUS | BORED | EMBARASSED | SAD | CONFUSED | DISTURBED | ENVIOUS |
| DISGUSTED | ASHAMED | GUILTY | VERY SAD | ANGUISHED | HURT | SHOCKED |

Fig. 2A

| THINGS | FOOD | CLOTHES | PLACES | EVENTS |
| MUSIC | MOVIES | TV | GAMES | BOOKS |
| SPORTS | ART | ACTIVITIES | TECHNOLOGY | IDEAS |
| PEOPLE | ORGANIZATIONS | ANIMALS | PLANTS | OTHER |

US 10,268,640 B1

SYSTEM FOR COMMUNICATION OF OBJECT-DIRECTED FEELINGS

BACKGROUND OF THE INVENTION

The present invention relates generally to software and, more specifically, to methods, systems, devices, and software for communicating emotionally-charged content.

Currently, online communication of emotionally-charged content often relies on use of nonstandard punctuation and capitalization, as well as emoticons, face glyphs, and looping animations. These symbols are sent or posted on their own or are arbitrarily added to text. There is no established shorthand way to communicate a feeling directed at a particular subject, such as a person, place, thing, or event. Instead, communication of object-directed feelings is typically imprecise, inconsistent, and transient and thus difficult to retrieve after a certain time period has passed. It is also not coherent with previous or future object-directed emotive communication and is difficult to compare with the user's other object-directed feelings or such feelings of other users.

U.S. Pat. No. 7,752,270, issued to Durand et al., entitled "Linking sounds and emoticons," filed on Jan. 21, 2004, describes a method and an apparatus for associating sounds with emoticons to generate a message bearing an emoticon and a sound file associated with the emoticon.

U.S. Pat. No. 8,271,902, issued to Mangini et al., entitled "Communication of emotions with data," filed on Jul. 20, 2006, describes a method and an apparatus for associating a graphic image conveying an emotion with a text comment and displaying the two elements in a manner indicating the association.

US Patent Application No. US20140195619, to Hodjat, entitled "Emotive Text Messaging System," filed on Jan. 7, 2013, describes a method and an apparatus for associating text with a background color conveying an emotional value.

U.S. Pat. No. 8,918,339, issued to Rubinstein et al., entitled "Associating an indication of user emotional reaction with content items presented by a social networking system," filed on Mar. 15, 2013, describes a method for associating a content item in a social networking system with an emoji representing the user's emotional reaction.

None of the patents and patent applications cited above provide a method that allows a user to quickly and easily communicate feelings associated with particular subjects that are specified by the user in a systematic manner.

In light of these limitations of means currently employed in emotive communication, there is a clear need for a coherent and easy-to-use communication system for object-directed feelings.

BRIEF SUMMARY OF THE INVENTION

Here described is a simple yet comprehensive system for rapid and precise communication of object-directed feelings that is coherent with past and future communication of this type. Aspects of the system allow users to easily generate, display, compare, edit, reply to, store, and retrieve posts that convey an association between a subject and an emotional state. In effect, aspects of the invention allow a user to generate a comprehensive emotional profile and to compare this profile to those of other users, either in part or in entirety. Additionally, aspects of the invention generate, analyze, compare, store, and retrieve data pertaining to feelings associated with particular subjects, as well as display this data in various ways. Such data may be used for research or commercial purposes.

The features described in the specification are not all-inclusive; numerous additional features will be apparent to one of ordinary skill in the art in view of the specification, drawings, and claims. The disclosed methods may be practiced according to the claims without some or all of these specific details. The language employed in the specification has been primarily selected for readability and instructional purposes, and may not have been chosen to delineate or circumscribe the disclosed subject matter.

BRIEF DESCRIPTION OF THE DRAWINGS

Various embodiments of the invention are disclosed in the following detailed description and the accompanying drawings. Whenever practicable, similar or like reference numbers are used in the figures to indicate similar or like functionality.

FIGS. 2A-2D show GUIs that may be used to select a symbolic emotional state or multiple symbolic emotional states, in accordance with various embodiments.

DETAILED DESCRIPTION OF THE INVENTION

The following detailed description is not limited to any particular example and does not limit the invention. Instead, the scope of the invention is defined by the appended claims. Alternative embodiments of the structures and methods illustrated herein may be employed without departing from the principles described herein.

Aspects of the invention may be implemented in various ways, including as a system, a process, an apparatus, or a computer program located on a computer-readable medium such as a storage medium or a computer network. A variety of input devices may be used to manipulate the graphical user interfaces (GUIs) used in various embodiments, including mice, keyboards, touchpads, touchscreens, and/or other input devices. In general, the disclosed operations may be performed in an arbitrary order unless otherwise specified.

Figure 1:
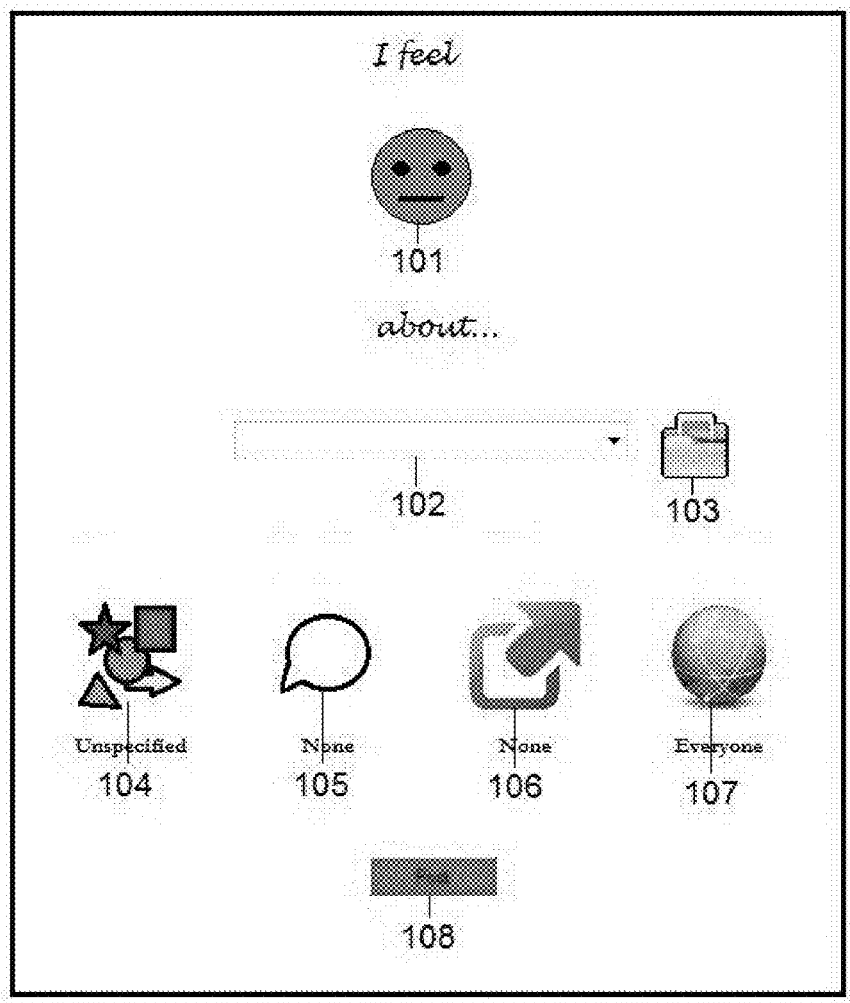
FIG. 1 shows a graphical user interface (GUI) that may be used to select a subject and a symbolic emotional state or multiple symbolic emotional states to be associated with it, as well as to add a category or multiple categories for the subject, text, pictures, webpage addresses, and/or an access level for the present post, in association with GUIs such as those shown in FIGS. 2-6 and in accordance with an embodiment.

FIG. 1 shows a GUI that may be used to select a subject and a symbolic emotional state or multiple symbolic emotional states to be associated with it, as well as to add a category or multiple categories for the subject, text, one or more pictures, one or more webpage addresses, and/or an access level for the present post, in association with GUIs such as those shown in FIGS. 2-6 and in accordance with an embodiment. The user can press button 101 to open a GUI used to select a symbolic emotional state or multiple symbolic emotional states, such those shown in FIGS. 2A-2D. The user can use the combo box 102 to type or select a subject for the post. In some embodiments, one or more categories for the subject may then be automatically assigned based on a prior association between the subject and the category or multiple categories. The user can press button 103 to open a standard GUI used to select a picture (not shown) and add it to the post. The user can press button 104 to open a GUI used to assign one or more categories to the subject, such those shown in FIGS. 3A-3B. The user can press button 105 to open a GUI used to add text to the post, such that that in FIG. 4. The user can press button 106 to open a GUI used to add one or more webpage addresses to the post, such that in FIG. 5. The user can press button 107 to open a GUI used to select an access level for the post, such as that in FIG. 6. The user can press button 108 to complete, store, and display the post. In embodiments involving social networking, the post may then be displayed in the user's account, as well as the accounts of users who were granted access by the user in question.

Figure 7:
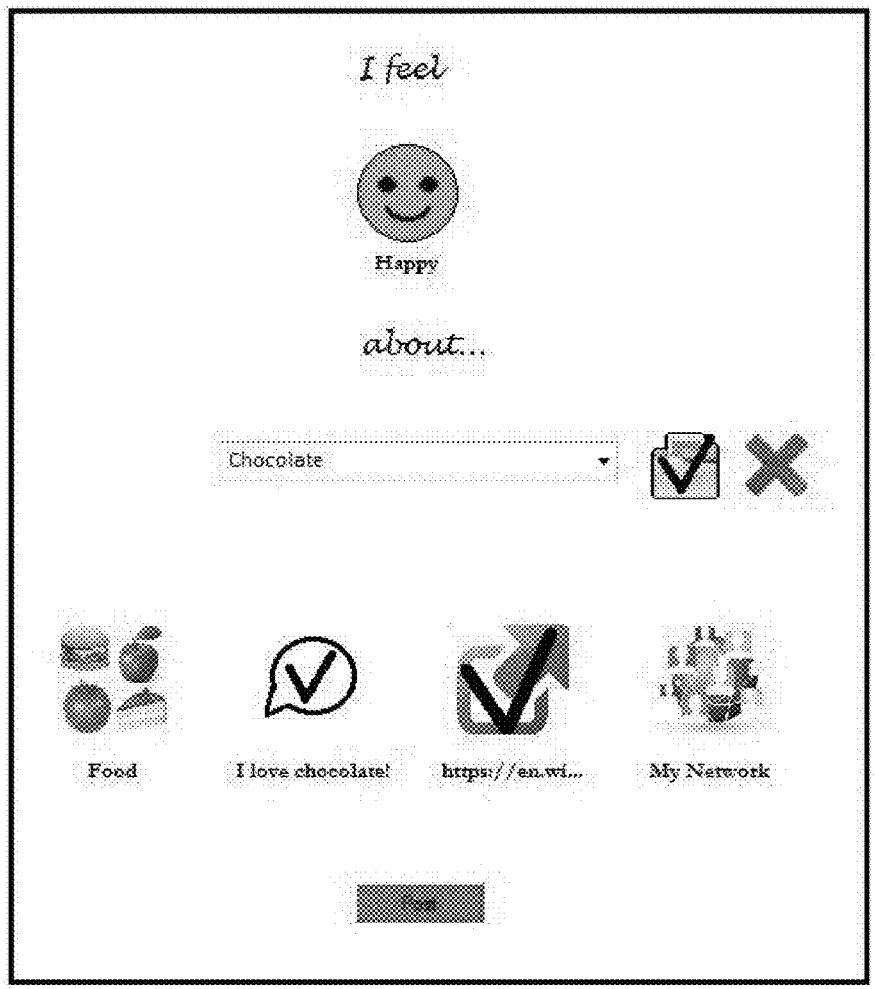
FIG. 7 shows the GUI from FIG. 1 with the subject, emotional state, category, text, picture, webpage address, and access level selected, in accordance with an embodiment.

FIG. 7 shows the GUI from FIG. 1 with the emotional state, subject, picture, category, text, webpage address, and access level selected. The labels under the buttons indicate the user's selections.

In alternate embodiments, some aspects of a GUI such as that in FIG. 1 may be modified or omitted, and/or other aspects may be added. Elements other than a combo box and buttons may be used, and their number and appearance may vary. The user's selections may be indicated differently or not at all.

Figure 2B:
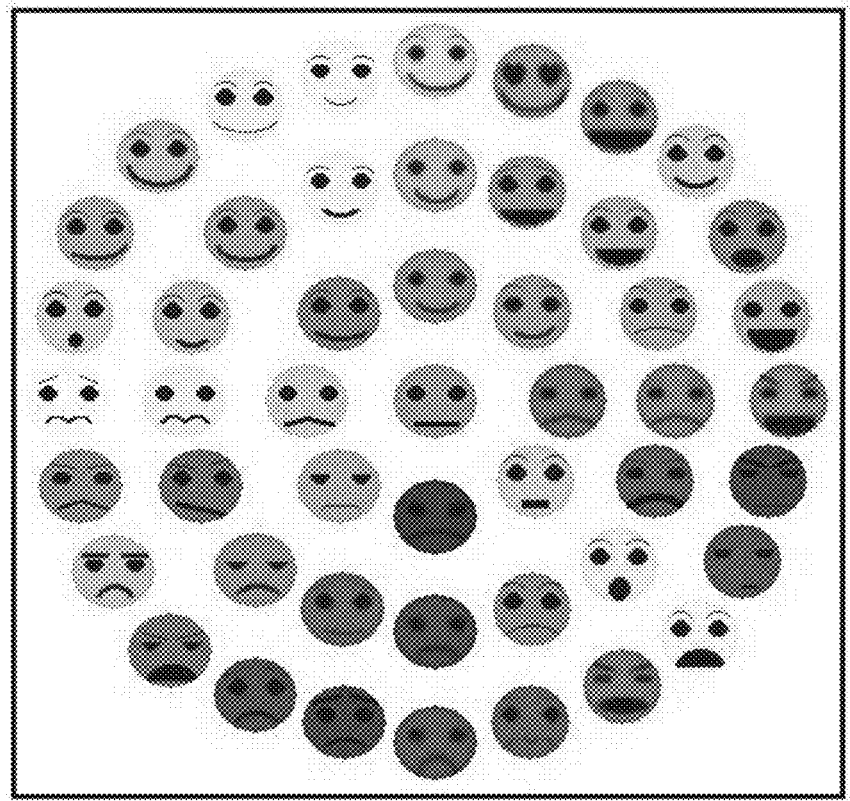
Figure 2C:
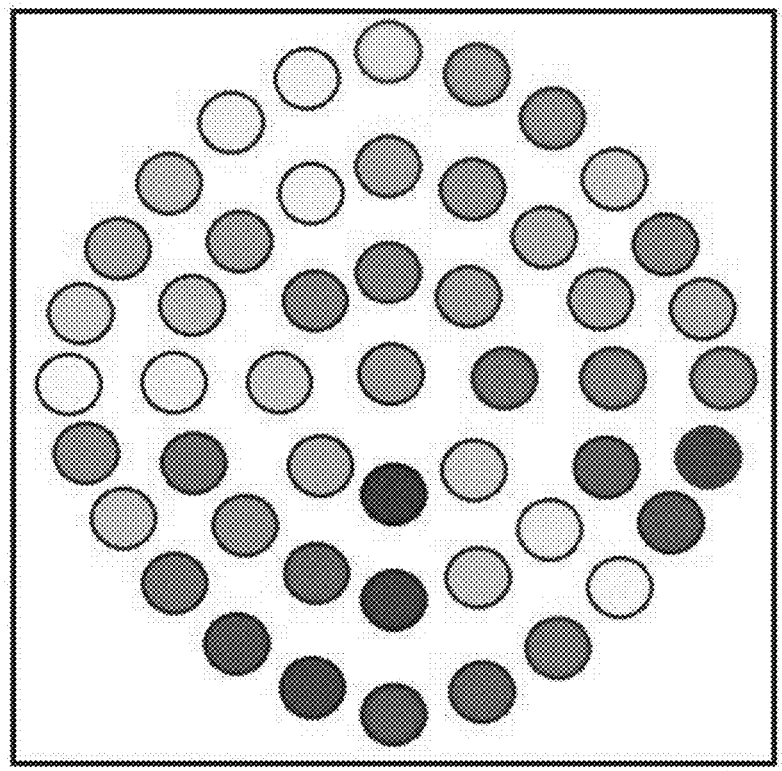
Figure 2D:
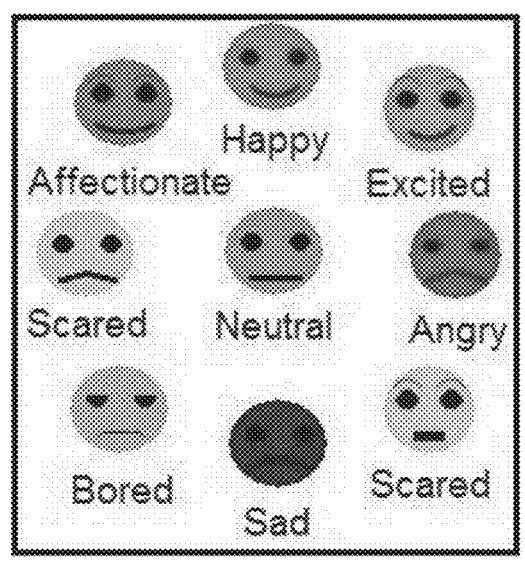

FIGS. 2A-2D show GUIs that may be used to select a symbolic emotional state or multiple symbolic emotional states, in accordance with various embodiments. In FIG. 2A, emotional states are represented by words conveying the emotional state in question. In FIG. 2B, they are represented by face glyphs. In FIG. 2C, they are represented by colors, in alternate embodiments, the colors may lie on a continuous scale rather than have discreet values. In FIG. 2D, emotional states are represented by combinations of face glyph, color, and text. In these examples, the user can press on a particular symbolic emotional state or multiple symbolic emotional states to select them.

In alternate embodiments, symbolic emotional states may vary in type, number, position, relative order, and/or other features. They may lie on a continuous or a discreet scale and may be represented by hues, intensities, color saturations, shapes, patterns, videos, animations, numbers, text, relative position, relative size, or other symbols, or any combination thereof. They may be chosen from a predetermined set of symbolic emotional states or inputted manually. The selection of symbols for specific emotional states may be arbitrary or systematic. Other elements may be present, and alternate GUI elements may be used. In some embodiments, symbolic emotional states may be selected and/or customized according to user preferences, including use of alternate emotional states, alternate symbols for specific emotional states, and other ways.

Figures 3A, 3B:
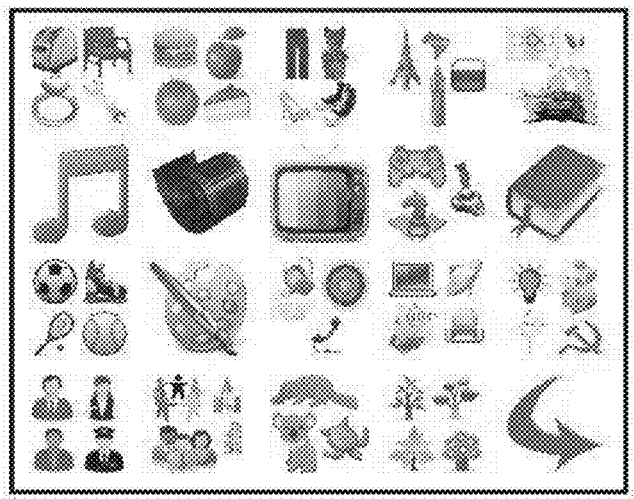
FIGS. 3A-3B show GUIs that may be used to assign a category or multiple categories to the subject, in accordance with various embodiments.

FIGS. 3A-3B show GUIs that may be used to assign one or more categories to the subject of the post, in accordance with various embodiments. In FIG. 3A, categories are represented by words conveying the category in question. In FIG. 3B, they are represented by images. In these examples, the user can press on a category or multiple categories to select them.

In alternate embodiments, categories may vary in type, number, relative order, and/or other features, or a GUI for category selection may be absent altogether. Categories may be represented by text, shapes, images, videos, animations, or other symbols, or any combination thereof. They may be chosen from a predetermined set of categories or inputted manually. The selection of symbols for specific categories may be arbitrary or systematic. Other elements may be present, and alternate GUI elements may be used. In some embodiments, categories may be selected and/or customized according to user preferences, including use of alternate categories, alternate symbols for specific categories, and other ways.

In some embodiments, a category or multiple categories may be automatically assigned to the subject based on a prior association between the subject and the category or multiple categories. Such prior associations may be based on predetermined assignments in a database and/or on a prior assignment of a category or multiple categories to the subject in question by one or more users.

Figure 4:
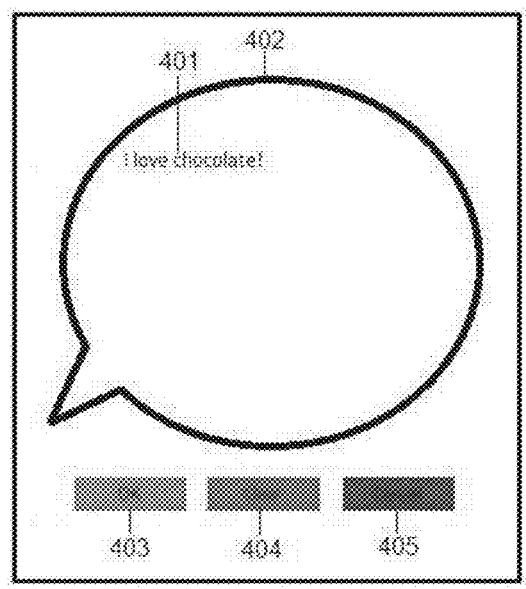
FIG. 4 shows a GUI that may be used to add text to the present post, in accordance with an embodiment.

FIG. 4 shows a GUI that may be used to add text to the present post, in accordance with an embodiment. The user can type or paste text into textbox 401 inside the speech bubble image 402, add the text to the post by pressing button 403, clear the existing text by pressing button 404, and cancel the operation by pressing button 405.

In alternate embodiments, buttons and/or images may vary or be absent, multiple textboxes may be present, other GUI elements may be used, or this GUI may be absent altogether. Text may be inputted manually or selected from a predetermined set of words, expressions, alphanumeric characters, and/or other symbols.

Figure 5:
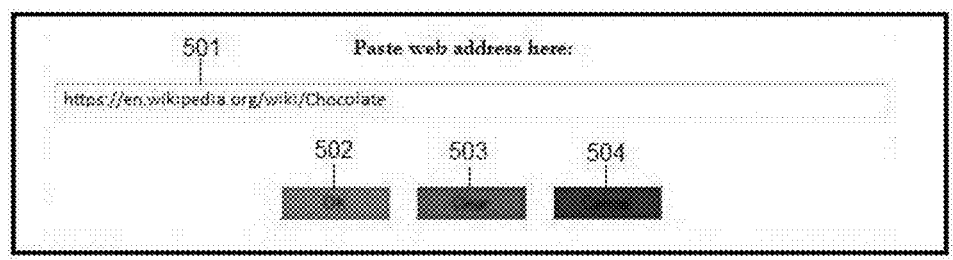
FIG. 5 shows a GUI that may be used to add webpage addresses to the present post, in accordance with an embodiment.

FIG. 5 shows a GUI that may be used to add one or more webpage addresses to the present post, in accordance with an embodiment. The user can type or paste a webpage address into textbox 501, add the address to the post by pressing button 502, clear the existing text by pressing button 503, and cancel the operation by pressing button 504.

In alternate embodiments, buttons and/or images may vary or be absent, multiple textboxes may be present, other GUI elements may be used, or this GUI may be absent altogether.

Figure 6:
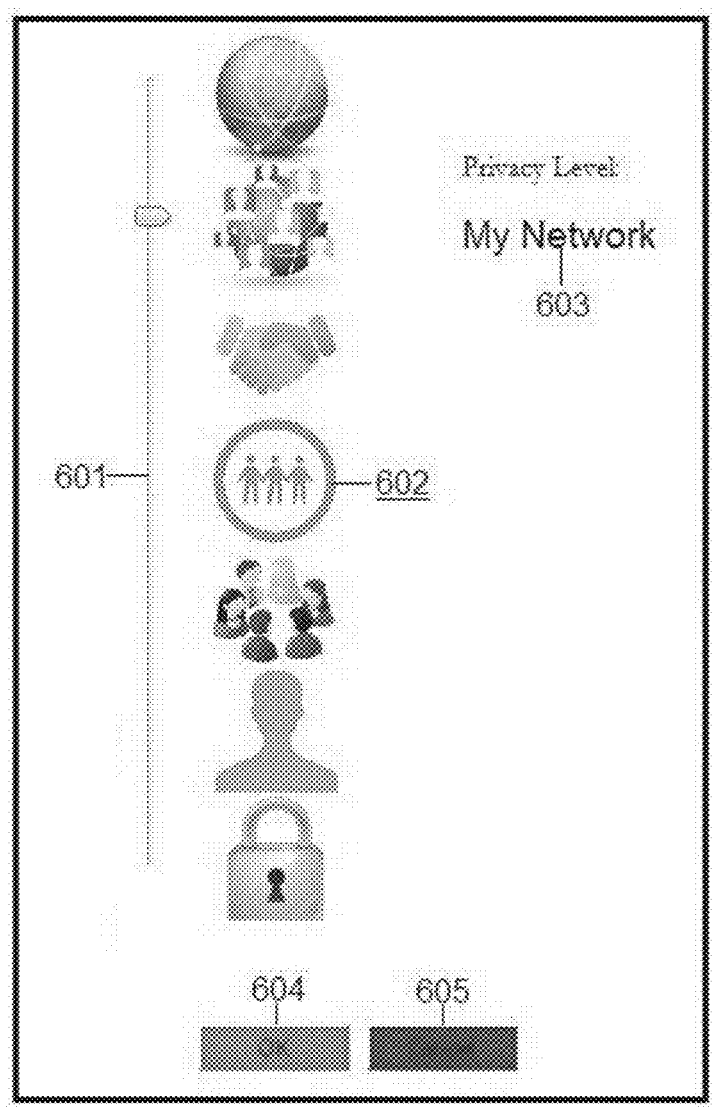
FIG. 6 shows a GUI that may be used to add an access level to the present post, in accordance with an embodiment.

FIG. 6 shows a GUI that may be used to select an access level for the present post, in accordance with an embodiment. Images 602 represent different access levels, and the user can change the access level by moving vertical slider 601 to the appropriate position. In this example, the user can select the level "Everyone," "My Network," "Trusted," "Closest," "Group," or "Just Me" in order to grant a particular set of users access to the post. Text 603 changes to reflect the current selection. The user can set the access level of the post to the current selection by pressing button 604 or cancel the operation by pressing button 605.

In alternate embodiments, images may vary or be absent, and elements other than a slider, images, and buttons may be used. Access levels may vary in name, number, relative order, set of users granted access, and/or other features, or this GUI may be absent altogether. Access levels may be represented by text, shapes, images, videos, animations, or other symbols, or any combination thereof. The selection of symbols for specific access levels may be arbitrary or systematic. A user may be able to select multiple groups of users and/or individual users to receive access to the present post.

Figure 8A:
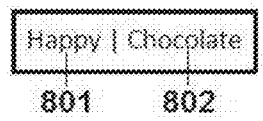
FIGS. 8A-8D show examples of posts that may be generated by an association between a subject and a symbolic emotional state or multiple symbolic emotional states, with and without additional elements, in accordance with various embodiments.
Figure 8B:
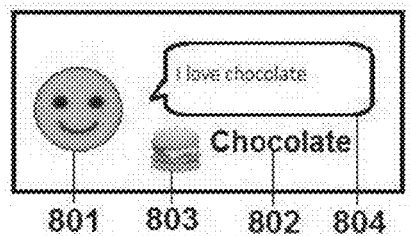
Figure 8C:
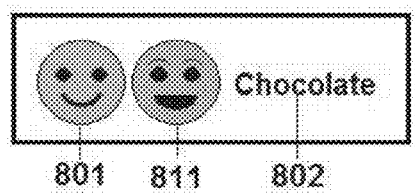
Figure 8D:
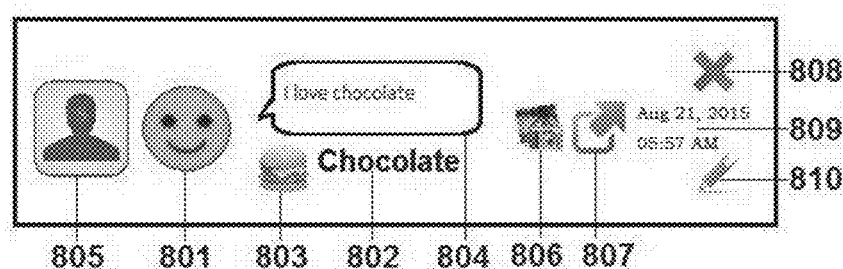

FIGS. 8A-8D show examples of posts that may be generated by an association between a subject and a symbolic emotional state or multiple symbolic emotional states, with and without additional elements, in accordance with various embodiments. Image 805 identifies the user who generated the present post. In some embodiments, it may be pressed to display information pertaining to the user in question (not shown). Text or face glyph 801 indicates the emotional state associated with the subject. In FIG. 8C, two symbolic emotional states are associated with the subject: face glyph 801 and face glyph 811. Text 802 indicates the subject toward which the feeling is directed. In some embodiments, it may be pressed to display additional information about the subject in a GUI such as that in FIG. 12. Image 803 represents the category assigned to the subject. In some embodiments, it may be pressed to display other subjects in the present category and/or information pertaining to the category in a GUI such as that in FIG. 13. In alternate embodiments, multiple category images may be present to indicate the assignment of multiple categories to subject. Image 804 displays the text added to the post, either in part or in entirety. In some embodiments, it may be pressed to display the full text in a larger GUI (not shown). Image 806 signifies that a picture was added to the post; it may be pressed to open a standard GUI displaying the picture in question (not shown). In some embodiments, image 806 may be a smaller or full-sized version of the picture added to the post. In alternate embodiments, multiple pictures may be present. Image 807 signifies that a webpage address was added to the post; it may be pressed to open a browser and display the page in question. In alternate embodiments, multiple webpage addresses may be present. Text 809 marks the date and time when the post was generated. In some embodiments, different chronological markers, such as day of the week, may be present. Image 808 may be pressed to delete the post. Image 810 may be pressed to edit the present post or to reply to it if it was generated by another user; the image may change to indicate the former and the latter cases. The data associated with the post may then be transferred to a GUI such as that in FIG. 1. In some embodiments, when replying to a post, a user may associate a symbolic emotional state or multiple symbolic emotional states with the post itself, in addition to associating a symbolic emotional state or multiple symbolic emotional states with the subject of the post. In this way, he is able to communicate both a feeling about the post and a feeling about the subject of the post. Alternatively, a user may associate a symbolic emotional state or multiple symbolic emotional states only with the subject of the post or only with the post itself.

In alternate embodiments, the aforementioned elements may vary in size, number, position, relative order, and/or other features, may be represented by text, images, videos, animations, and/or other symbols, or may be absent altogether. Additional elements may be present, including text, images, music, videos, animations, or other elements. In some embodiments, elements may be selected and/or customized according to user preferences. The core template for a post requires only that a subject and at least one symbolic emotional state be provided; all other elements are optional.

Figure 9A:
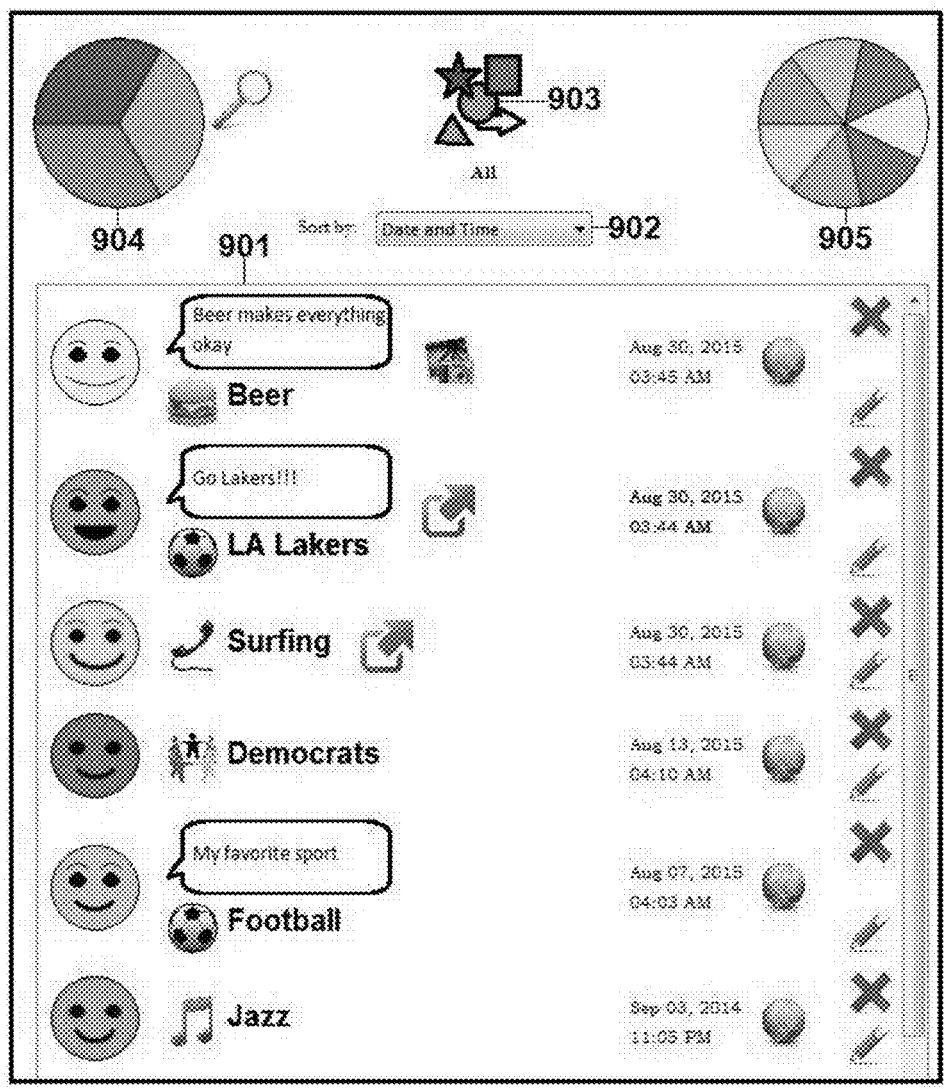
FIGS. 9A-9B show GUIs displaying posts that convey associations between a subject and a symbolic emotional state, in accordance with various embodiments.
Figure 9B:
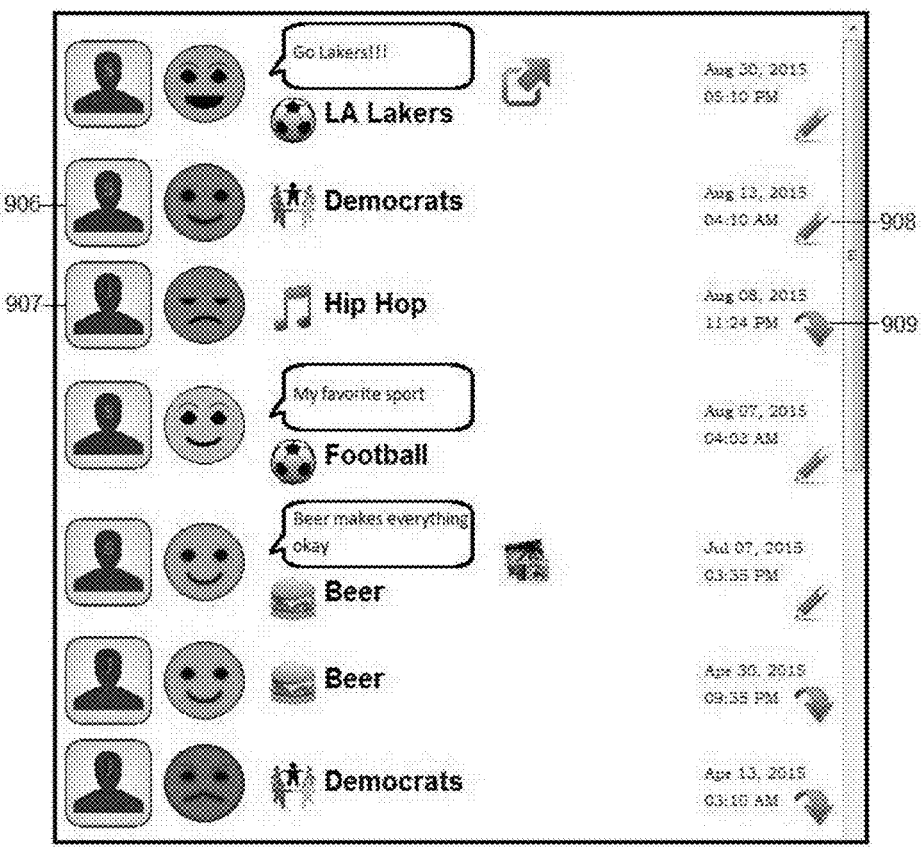

FIGS. 9A-9B show GUIs displaying posts generated by an association between a subject and a symbolic emotional state, in accordance with various embodiments. The GUI in FIG. 9A displays posts generated by a single user. Box 901 contains posts, such as those in FIG. 8D, arranged vertically. In alternate embodiments, the content and appearance of individual posts may vary, as long as all posts present an association between a subject and a symbolic emotional state or multiple symbolic emotional states and remain coherent with each other, in the sense that they can be organized, sorted, compared with each other, and displayed using a similar or same template. Droplist 902 allows the user to select a criterion by which to sort the posts; the criteria in question may include date and time, subject, emotional state, and other criteria. The user may press button 903 to open a GUI such as those in FIGS. 3A-3B and select a category, so that only posts with subjects in the chosen category are displayed. Pie chart 905 shows the relative proportions of particular emotional states in the displayed posts; in this example, the colors correspond to the colors of the symbolic emotional states in question. Pie chart 904 shows the relative proportions of particular emotional states in posts whose subject is the user associated with the account where the present page is displayed. In this way, the user can quickly and easily see both how he feels about various subjects and how other users feel about him. Alternatively, the proportions can be displayed with another type of chart, such as a bar chart, an alternate image, text, video, animation, or a combination thereof. In some embodiments, the user may press on pie charts 904 and 905 to display a more detailed GUI, such as that in FIG. 10. The GUI in FIG. 9B displays posts, such as those in FIG. 8D, generated by multiple users, which are identified by unique images 906 and 907. In embodiments involving social networking, the user who generated the post (identified by image 906 in this example) may press on image 908 to edit the post in question or on image 909 to reply to a post generated by another user (identified by image 907 in this example). The data associated with the post may then be transferred to a GUI such as that in FIG. 1.

In alternate embodiments, some aspects of a GUI such as those in FIGS. 9A-9B may be modified or omitted, and/or other aspects may be added. Multiple symbolic emotional states and/or multiple categories for a subject may be present in a post. Other GUI elements may be used, and their number and appearance may vary. The displayed posts may be restricted to a particular user or set of users, category or multiple categories of subjects, set of symbolic emotional states, time period of posting, geographic location, gender, age range, or ethnicity of posting users, or other criteria, or combinations thereof. These criteria may be predetermined or chosen by the user. The posts may be displayed simultaneously or sequentially.

Figure 10:
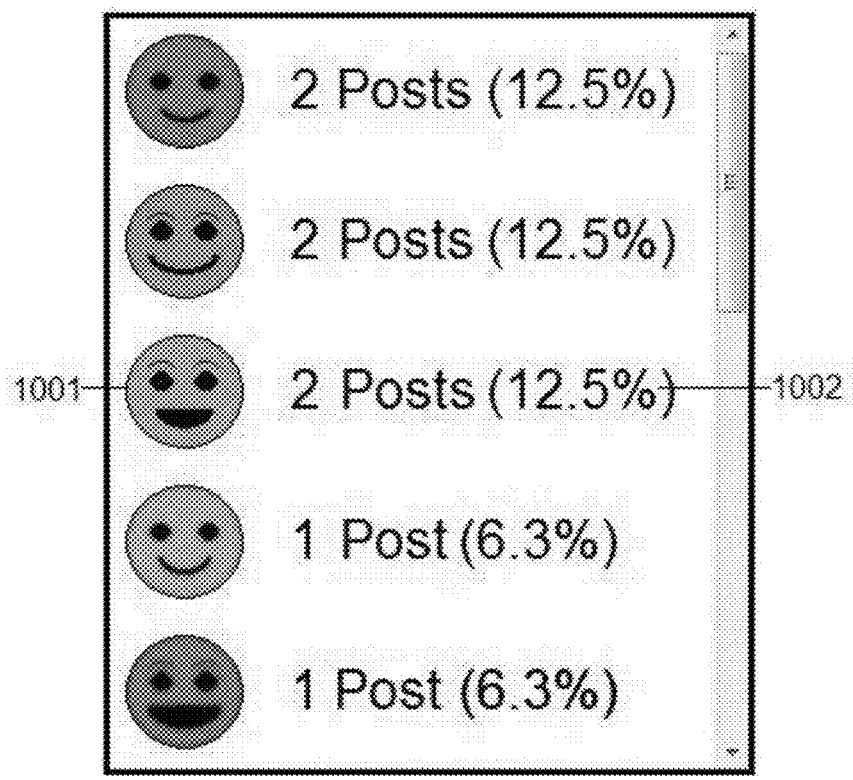
FIG. 10 shows a GUI displaying the number and proportion of posts containing a particular symbolic emotional state, in accordance with an embodiment.

FIG. 10 shows a GUI displaying the numbers and proportions of posts that contain a particular symbolic emotional state, in accordance with an embodiment. For example, text 1002 conveys the number and percentage of posts that contain the symbolic emotional state represented by face glyph 1001. The other combinations of face glyph and text convey the numbers and percentages of posts that contain other symbolic emotional states. The data in this GUI can be restricted to a particular user or set of users, category or multiple categories of subjects, time period of posting, geographic location, gender, age range, or ethnicity of posting users, or other criteria, or combinations thereof. The symbolic emotional states may be represented by text, images, videos, animations, or other symbols. Numbers and proportions of posts that contain a particular category or multiple categories of subjects, multiple symbolic emotional states, posting user or set of users, time period of posting, geographic location, gender, age range, or ethnicity of posting users, or other specific criteria may be displayed in a similar manner.

In alternate embodiments, some aspects of a GUI such as that in FIG. 10 may be modified or omitted, and/or other aspects may be added. Other GUI elements may be used, and their number and appearance may vary.

Figure 11:
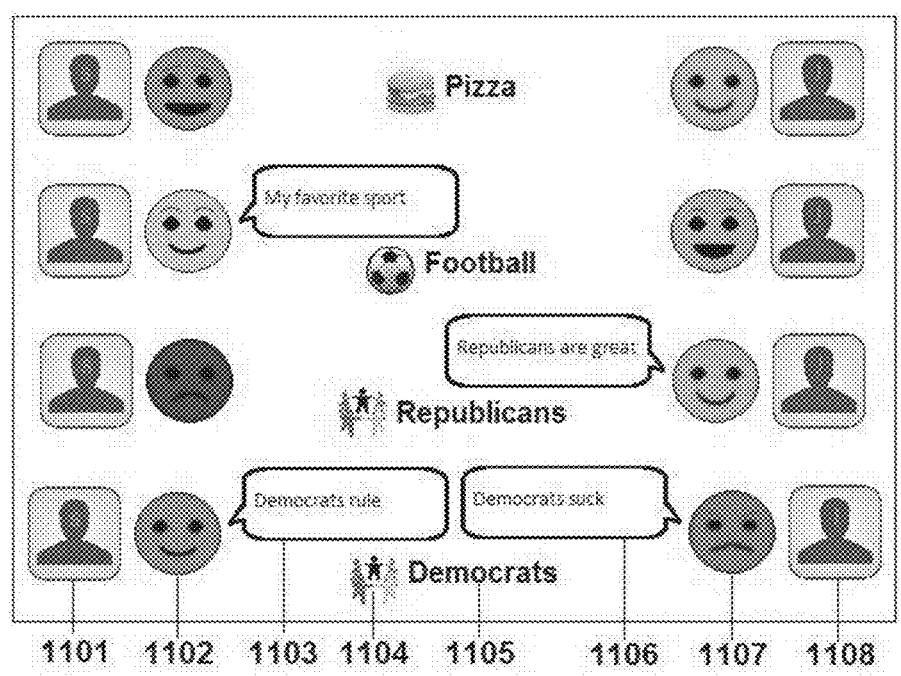
FIG. 11 shows a GUI displaying a comparison of two users' feelings with respect to particular subjects, in accordance with an embodiment.

FIG. 11 shows a GUI displaying comparisons of two users' feelings with respect to particular subjects, in accordance with an embodiment. Subjects that are present in the posts of both users are displayed. The individual comparisons are arranged in vertical sequence and presented using a similar template. Images 1101 and 1108 identify the two users whose feelings are compared. In some embodiments, they may be pressed to display information pertaining to the respective user (not shown). Face glyphs 1102 and 1107 indicate the feelings of the respective users, as represented by the symbolic emotional states associated with the subject in question. Text 1105 indicates the subject toward which the feelings are directed. In some embodiments, it may be pressed to display additional information about the subject in a GUI such as that in FIG. 12. Images 1103 and 1106 display the text that was added to the respective users' posts about the subject in question. In some embodiments, they may be pressed to display the text in a larger GUI (not shown). Image 1104 represents the category assigned to the subject. In some embodiments, it may be pressed to display other subjects in the present category and/or information pertaining to the category in a GUI such as that in FIG. 13. The other comparisons convey the two users' feelings with respect to other subjects. In alternate embodiments, object-directed feelings of more than two users may be compared. The displayed comparisons may be restricted to a particular set of users, category or multiple categories of subjects, set of symbolic emotional states, time period of posting, geographic location, gender, age range, or ethnicity of posting users, or other criteria, or combinations thereof. These criteria may be predetermined or chosen by the user. Comparisons may be displayed simultaneously or sequentially. Multiple symbolic emotional states and/or multiple categories for the subject may be present in an individual comparison.

In alternate embodiments, the aforementioned elements may vary in size, number, position, relative order, and/or other features, may be represented by text, images, videos, animations, and/or other symbols, or may be absent altogether. Additional elements may be present. The template for a comparison requires only that a subject and at least one symbolic emotional state per user be provided; all other elements are optional.

In embodiments involving social networking, a comparison may be automatically generated and displayed in a GUI such as that in FIG. 11 when the subject of a new post generated by a user matches the subject of an existing post generated by the present user (the user in whose account the GUI is displayed) or a user affiliated with or selected by the present user. Such automatically generated comparisons may be limited to posts generated by the present user and/or users affiliated with or selected by the present user. Comparisons may thus be continuously generated and updated without deliberate action on the part of the user.

Figure 12:
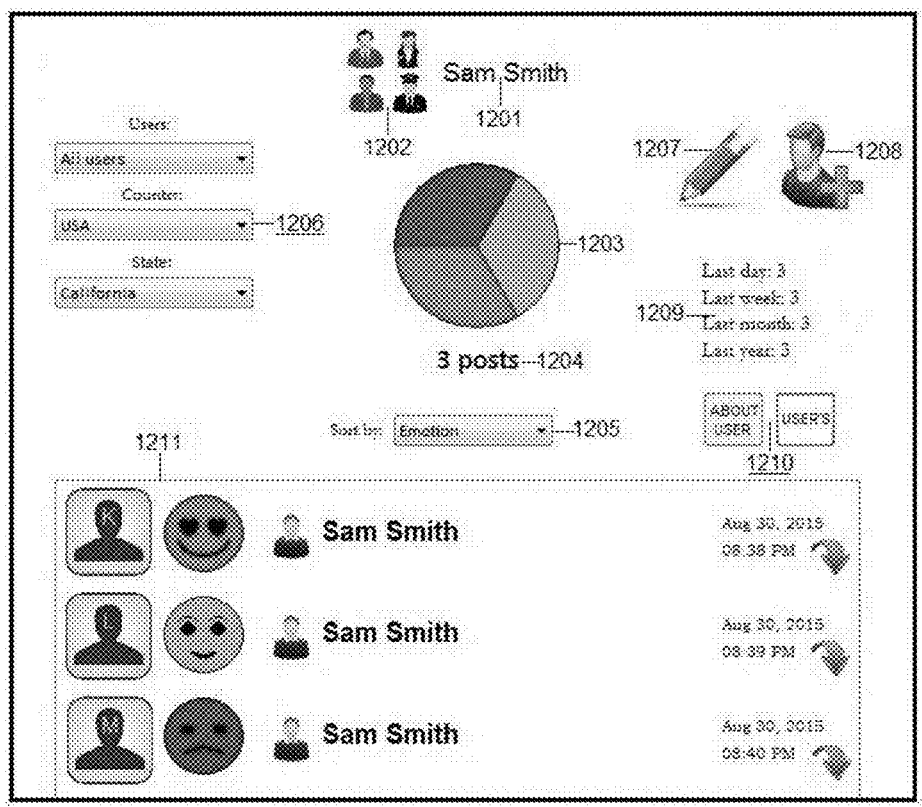
FIG. 12 shows a GUI displaying data pertaining to feelings about a particular subject, in accordance with an embodiment.

FIG. 12 shows a GUI displaying data pertaining to feelings associated with a particular subject, in accordance with an embodiment. Text 1201 indicates the subject in question. Image 1202 represents the category assigned to the subject. In some embodiments, it may be pressed to display other subjects in the present category and/or information pertaining to the category in a GUI such as that in FIG. 13. Multiple categories for the subject may be present. Pie chart 1203 shows the relative proportions of particular emotional states in posts about the subject in question; in this example, the colors correspond to the colors of the symbolic emotional states in question. Alternatively, the proportions can be displayed with another type of chart, such as a bar chart, an alternate image, text, video, animation, or a combination thereof. In some embodiments, the user may press on pie chart 1203 to display a more detailed GUI, such as that in FIG. 10. The number of posts represented in the chart is conveyed by text 1204. Box 1211 contains posts about the subject in question, such as those in FIG. 8D. In alternate embodiments, the content and appearance of individual posts may vary, as long as all posts convey an association between a subject and a symbolic emotional state or multiple symbolic emotional states and remain coherent with each other, in the sense that they can be organized, sorted, compared with each other, and displayed using a similar or same template. The displayed posts may be restricted to a particular user or set of users, set of symbolic emotional states, time period of posting, geographic location, gender, age range, or ethnicity of posting users, or other criteria, or combinations thereof. These criteria may be predetermined or chosen by the user. The posts may be displayed simultaneously or sequentially. In this example, the user may use droplists 1206 to restrict the posts about the subject in question to those generated by users in a particular geographic location and/or users with a particular access level. Droplist 1205 allows the user to select a criterion by which to sort the posts; the criteria in question may include date and time, posting user, emotional state, and other criteria. The user can press on image 1207 to create a post about the subject in question or to edit such a post if it already exists; the image may change to indicate the former and the latter cases. The subject and its category or multiple categories may then be transferred to a GUI such as that in FIG. 1. The user can press on image 1208 to add the subject to a watchlist, such as that in FIG. 13, whereby posts about the subject (and those generated by the subject if it is another user, as is the case in this example) and related data can be tracked. Text 1209 conveys the number of posts about the subject generated within particular time intervals. In this example, the numbers of posts generated within the last day, week, month, and year are shown. In other embodiments, these intervals may vary and/or may be customizable. In cases where the subject in question is another user, as is the case in this example, buttons 1210 switch the state of the GUI from posts generated by this user and their corresponding data (see FIG. 9A) to posts about this user and their corresponding data, and back.

In alternate embodiments, some aspects of a GUI such as that in FIG. 12 may be modified or omitted, and/or other aspects may be added. Multiple symbolic emotional states and/or multiple categories for a subject may be present in a post. Other GUI elements may be used, and their number and appearance may vary.

In some embodiments, some aspects of a GUI such as that in FIG. 12 may be employed by a user to find users who have expressed a particular feeling about a particular subject. For example, a user may select a subject and a geographic location and sort the displayed posts by emotional state in order to find users who have posted an association between the subject in question and a particular symbolic emotional state or multiple symbolic emotional states. In some embodiments, the geographic location of the user in question may be automatically selected by default to aid his search. Only posts wherein the emotional state associated with a particular subject is similar to or same as that in a post generated by the user in question may be displayed to narrow down the search. Alternatively, the user may specify the permitted emotional state or set of emotional states. Similarity of emotional states associated with multiple subjects rather than only one subject may be taken into consideration when deciding how similar or different a particular user is from the user in question with respect to object-directed feelings. In this way, users are able to find like-minded individuals as well as individuals with opposing sentiments.

Figure 13:
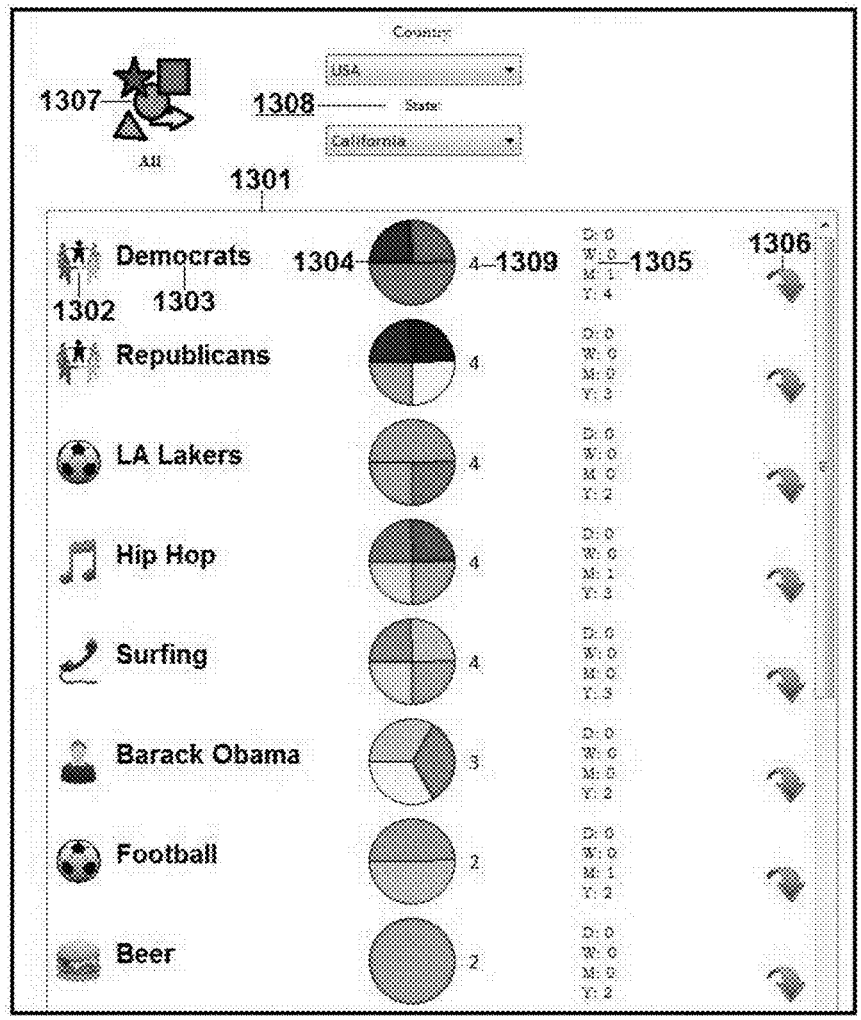
FIG. 13 shows a GUI displaying data pertaining to feelings about multiple subjects, in accordance with an embodiment.

FIG. 13 shows a GUI displaying data pertaining to feelings about multiple subjects, in accordance with various embodiments. The subjects may be selected by the user; they may belong to a particular category or multiple categories; they may be part of a watchlist created to keep track of feelings associated with particular subjects; they may be the subjects of posts of a particular user or set of users; they may be selected in order to directly compare the data pertaining to feelings associated with them; they may be chosen on the basis of the number of posts about them, as is the case in this example; or they may be selected based on other criteria. Box 1301 displays the subjects, arranged in vertical sequence and following a common template. In this example, the subjects are sorted by the number of posts generated about them. Text 1303 indicates the subject in question. In some embodiments, it may be pressed to display additional information about the subject in a GUI such as that in FIG. 12. Image 1302 represents the category assigned to the subject. In some embodiments, it may be pressed to display other subjects in the present category and/or information pertaining to the category. In alternate embodiments, multiple category images may be present to indicate the assignment of multiple categories to subject. Pie chart 1304 shows the relative proportions of particular emotional states in posts about the subject. Alternatively, the proportions can be displayed with another type of chart, such as a bar chart, an alternate image, text, video, animation, or a combination thereof. In some embodiments, the user may press on pie chart 1304 to display a more detailed GUI, such as that in FIG. 10. Number 1309 conveys the number of posts represented in the chart. Text 1305 shows the number of posts about the subject generated within particular time intervals. In this example, the numbers of posts generated within the last day ("D"), week ("W"), month ("M"), and year ("Y") are shown. In other embodiments, these intervals may vary and/or may be customizable. The user may press on image 1306 to generate a post about the subject or to edit such a post if it already exists; the image may change to indicate the former and the latter cases. The subject and its category or multiple categories in the former case and the data associated with the existing post in the latter case may then be transferred to a GUI such as that in FIG. 1. The other combinations of the aforementioned elements convey data pertaining to feelings about other subjects. In alternate embodiments, the elements comprising a GUI component such as box 1301 may vary in size, number, relative order, and/or other features, may be represented by images, text, videos, animations, and/or other symbols, or may be absent altogether. Additional elements may be present. The data pertaining to feelings associated with subjects may be displayed simultaneously or sequentially. The user can press button 1307 to open a GUI used to select a category, such as those shown in FIGS. 3A-3B, in order to restrict the displayed subjects to a particular category. In this example, the user can use droplists 1308 to restrict the displayed subjects to those that have the most posts generated about them by users in a particular geographic location.

In alternate embodiments, some aspects of a GUI such as that in FIG. 13 may be modified or omitted, and/or other aspects may be added. Other GUI elements may be used, and their number and appearance may vary.

Figure 14:
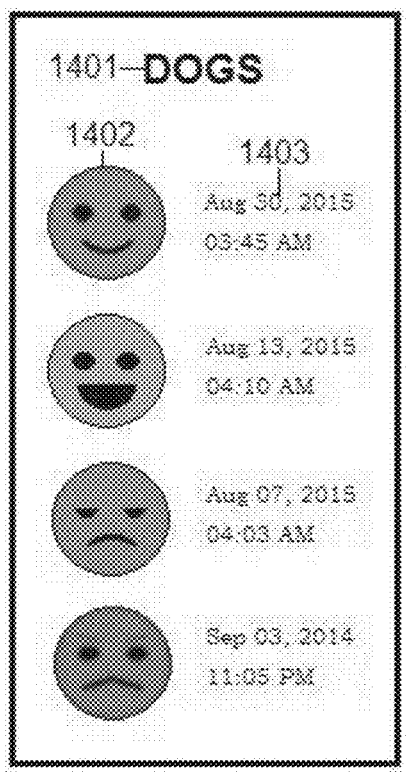
FIG. 14 shows a GUI that tracks a user's feelings toward a particular subject over time, in accordance with an embodiment.

FIG. 14 shows a GUI that tracks a user's feelings toward a particular subject over time, in accordance with an embodiment. For example, text 1403 conveys the date and time of the post generated by the user to associate the symbolic emotional state represented by image 1402 with the subject conveyed by text 1401. The other combinations of date and time and symbolic emotional state convey the user's feelings about the subject in question at different times. The items in a GUI such as that in FIG. 14 may be sorted by date and time or by emotional state.

In alternate embodiments, the aforementioned elements may vary in size, number, position, relative order, and/or other features, may be represented by text, images, videos, animations, and/or other symbols, or may be absent altogether. Additional elements may be present. Alternate chronological markers may be used. Multiple symbolic emotional states may be associated with a particular chronological marker.

Figure 15A:
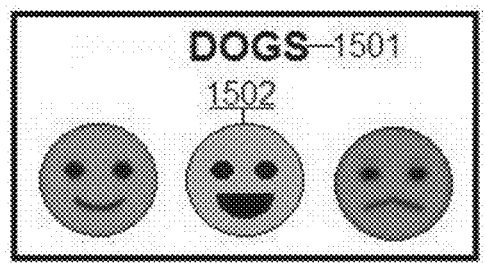
FIGS. 15A-15C show GUIs displaying tests or games wherein a user has to select or specify a symbolic emotional
Figure 15B:
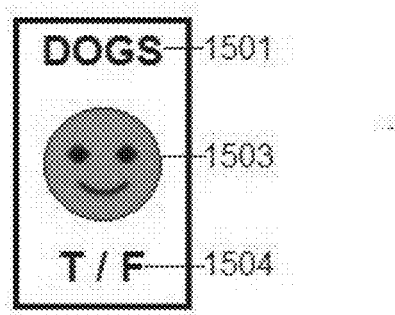
Figure 15C:
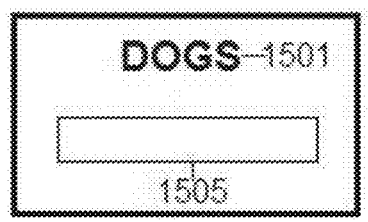

FIGS. 15A-15C show GUIs displaying tests or games wherein a user has to select or specify a symbolic emotional state associated with a particular subject in a post generated by another user, in accordance with various embodiments. In this way, a user can be tested on how well he knows the object-directed feelings of another user. Text 1501 indicates the subject in question in FIGS. 15A-15C. In FIG. 15A, face glyphs 1502 represent the choices presented to a user. The user has to press on a face glyph to indicate his selection of the symbolic emotional state associated with the subject in question. In alternate embodiments, symbolic emotional states may vary in type, number, position, relative order, and/or other features; they may lie on a continuous or a discreet scale and may be represented by hues, intensities, color saturations, shapes, patterns, videos, animations, numbers, text, relative position, relative size, or other symbols, or any combination thereof. A full set of symbolic emotional states, such as those in FIGS. 2A-2D, may be presented to the user to choose from. In FIG. 15B, face glyph 1503 represents the symbolic emotional state presented to a user. Text 1504 indicates that the user has to specify whether it is true or false that the symbolic emotional state in question matches the symbolic emotional state associated with the subject in question. The user may indicate his selection by pressing on the corresponding letter ("T" or "F"). In FIG. 15C, a user has to type in textbox 1505 the emotional state associated with the subject in question. After a user makes his selection in a GUI such as those in FIGS. 15A-15C, the game or test determines whether the user's selection matches the symbolic emotional state associated with the subject in question in the corresponding post generated by the user whose object-directed feelings the user in question is being tested on. The GUI may then present the correct answer or multiple correct answers at a time (not shown).

In alternate embodiments, some aspects of a GUI such as those in FIGS. 15A-15C may be modified or omitted, and/or other aspects may be added. Other GUI elements may be used, and their number and appearance may vary. Questions and selections pertaining to individual subjects may be displayed simultaneously or sequentially. In some embodiments where multiple symbolic emotional states may be associated with a subject, a user may select or specify multiple symbolic emotional states in games or tests such as those illustrated in FIGS. 15A-15C.

Products and/or services may be offered to a user based on their similarity to subjects of his posts that are associated with positive emotional states. Conversely, presentation of products and/or services to a user may be avoided when such products and/or services are judged to be similar to subjects of his posts that are associated with negative emotional states.

The embodiments described above and other embodiments of the invention provide methods, GUIs, and systems for communicating object-directed feelings rapidly and precisely. Posts generated by users follow a template containing, but not limited to, a subject and a symbolic emotional state or multiple symbolic emotional states associated with the subject. The posts are thus coherent with each other. Specifically, they can be easily and meaningfully grouped, organized, sorted, compared with each other, and analyzed as a group; the template allows for easy application of statistical analysis.

Certain features of the invention, which are, for the sake of clarity, described in the context of separate embodiments, may also be provided in combination in a single embodiment. Conversely, various features of the invention, which are described in the context of a single embodiment, may also be provided separately or in any suitable sub-combination. Although the invention has been described in conjunction with specific embodiments thereof, it is evident that numerous alternatives, modifications, and variations will be apparent to those skilled in the art. Accordingly, it is intended to embrace all such alternatives, modifications, and variations that fall within the scope of the appended claims.

I claim:

1. A computer-implemented method for communicating object-directed feelings between users of a social networking system by templated posts, the method comprising:

inputting or selecting a subject for a templated post, wherein said templated post is posted on said social networking system, said subject including a noun, noun phrase, title, hashtag, or name and being required from a user in order to generate said templated post;

selecting one or more symbolic emotional states from a plurality of symbolic emotional states, at least one of said symbolic emotional states being required from said user in order to generate said templated post;

automatically associating, by one or more computers, said subject with said one or more symbolic emotional states and storing this association in a database;

generating, by the one or more computers, said templated post including said subject and said one or more symbolic emotional states, wherein the generated templated post is coherent with other templated posts generated by said method, wherein said templated post and the other templated posts each include a particular subject and one or more particular symbolic emotional states such that one or more of sorting, grouping, categorizing, and/or comparing by subject or symbolic emotional state is permitted, each particular subject including a noun, noun phrase, title, hashtag, or name;

posting said templated post, by the one or more computers, to one or more of the users; and displaying, by the one or more computers, a representation of one or more of a number of templated posts that include one or more particular symbolic emotional states and/or a proportion of templated posts that include one or more particular symbolic emotional states.

2. The method of claim 1, wherein said symbolic emotional states include face glyphs, images, text, animations, videos, or any combination thereof.

3. The method of claim 1, further comprising assigning one or more categories to said subject.

4. The method of claim 1, wherein one or more categories for said subject are automatically assigned based on a prior templated post or plurality of templated posts including said subject and said one or more categories assigned to said subject.

5. The method of claim 1, further comprising adding text to said templated post including said subject and said one or more symbolic emotional states.

6. The method of claim 1, further comprising adding one or more images to said templated post including said subject and said one or more symbolic emotional states.

7. The method of claim 1, further comprising adding one or more webpage addresses to said templated post including said subject and said one or more symbolic emotional states.

8. The method of claim 1, further comprising selecting an access level that determines which users receive access to said templated post including said subject and said one or more symbolic emotional states.

9. The method of claim 1, further comprising displaying object-directed feelings of one or more users of said social networking system, comprising simultaneous or sequential display of templated posts, said templated posts each including a particular subject and one or more particular symbolic emotional states.

10. The method of claim 1, further comprising comparing object-directed feelings of multiple users of said social networking system, comprising simultaneous or sequential display of said multiple users' symbolic emotional states associated with a particular subject.

11. The method of claim 10, wherein a comparison of object-directed feelings of said multiple users of said social networking system is automatically generated when the subject of a new templated post including said subject and one or more particular symbolic emotional states matches the subject of an existing templated post.

12. The method of claim 1, further comprising generating and viewing data pertaining to feelings of one or more users of said social networking system associated with one or more subjects, said data being based on templated posts, said templated posts each including a particular subject and one or more particular symbolic emotional states.

13. The method of claim 12, wherein said users are restricted to a predetermined subset of users and/or said subjects are restricted to a predetermined category or plurality of categories of subjects.

14. The method of claim 1, further comprising keeping track of feelings of users of said social networking system associated with a particular subject or plurality of subjects, wherein a user types or selects a particular subject and is thereafter updated after another user or plurality of users generate one or more templated posts including said particular subject and one or more particular symbolic emotional states.

15. The method of claim 1, further comprising finding users of said social networking system who have communicated a particular feeling associated with a particular subject or plurality of subjects, said method being based on use of templated posts, said templated posts each including a particular subject and one or more particular symbolic emotional states.

16. The method of claim 1, further comprising knowledge-testing method wherein a user of said social networking system has to select or specify one or more particular symbolic emotional states associated with a particular subject, said particular subject and said one or more particular symbolic emotional states being based on an existing templated post including said particular subject and said one or more particular symbolic emotional states.

17. The method of claim 1, further comprising creating an emotional profile indicating a user's respective emotional states associated with a plurality of subjects, said profile being based on templated posts, said templated posts each including a particular subject and one or more particular symbolic emotional states.

18. The method of claim 1, wherein said representation is restricted to one or more subsets of the users that have posted templated posts, a particular subject or category of subjects included in the templated posts, a particular geographic location related to the templated posts, a particular gender related to the templated posts, and/or a particular age range related to the templated posts.

19. A computer-implemented method for communication of object-directed feelings between users of a social networking system, wherein the communication includes templated posts, and wherein the users include a first user, the method comprising:
 providing, by the first user, a subject for a templated post that is posted on the social networking system, wherein the subject includes a noun, a noun phrase, a title, a hashtag, or a name, and wherein provision of the subject is required for the templated post, wherein the templated post is posted on the social networking system;
 selecting, by the first user, one or more symbols for emotional states for the templated post that is posted on the social networking system, wherein the one or more symbols are selected from a plurality of symbols for emotional states, and wherein selection of at least one such symbol is required for the templated post, wherein the templated post is posted on the social networking system;
 generating, by one or more computers, the templated post, wherein the templated post includes the subject and the one or more selected symbols for emotional states;
 creating, by the one or more computers, an association between the subject and the one or more selected symbols for emotional states;
 posting, by the first user, the templated post on the social networking system to one or more of the users; and
 storing the association in a non-transitory computer-readable storage medium, wherein storage permits one or more of sorting, grouping, categorizing, and/or comparing of the templated posts that have been posted on the social networking system by subject and/or emotional state, wherein individual templated posts are required to include a particular subject and one or more particular symbols for emotional states, each particular subject including a noun, a noun phrase, a title, a hashtag, or a name.

20. The method of claim 19, further comprising:
 creating a profile for the first user, wherein the profile is based on templated posts previously posted by the first user, wherein individual templated posts were required to include a particular subject and one or more particular symbols for emotional states; and
 displaying the profile on the social networking system to one or more of the users.

* * * * *